UNITED STATES PATENT OFFICE.

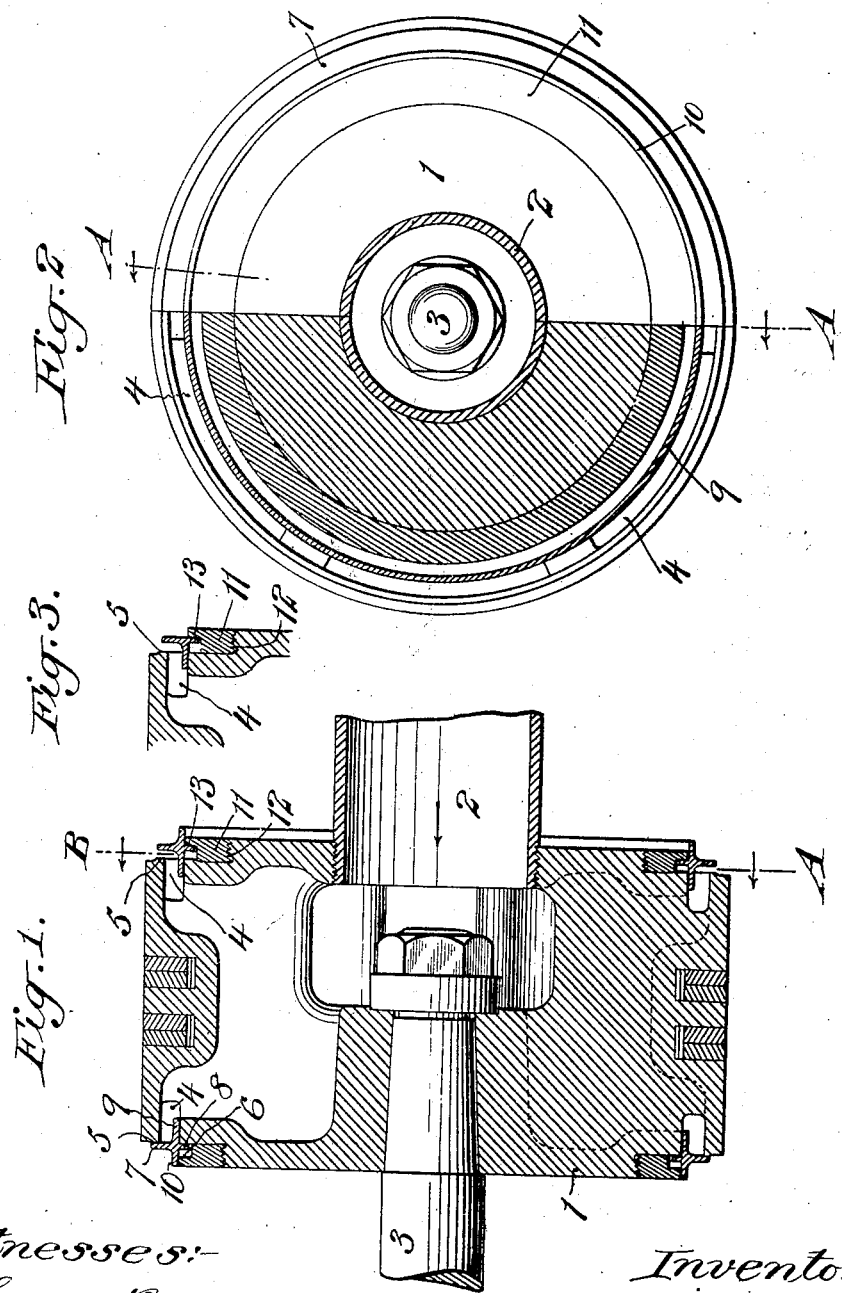

HENRY C. SERGEANT, OF WESTFIELD, NEW JERSEY, ASSIGNOR TO INGERSOLL-RAND COMPANY, OF NEW YORK, N. Y., A CORPORATION OF NEW JERSEY.

PISTON INLET-VALVE.

No. 904,459.   Specification of Letters Patent.   Patented Nov. 17, 1908.

Application filed October 2, 1906. Serial No. 337,117.

*To all whom it may concern:*

Be it known that I, HENRY C. SERGEANT, a citizen of the United States, and resident of Westfield, in the county of Union and State of New Jersey, have invented a new and useful Improvement in Piston Inlet-Valves, of which the following is a specification.

This invention consists in an improvement in compressors such as are commonly known as air compressors but which are also applicable for the compression of other gaseous or aeriform bodies.

The invention particularly relates to improvements in the piston and its valve or valves and has for its objects to provide certain advantageous features in the construction, form and arrangement of the several parts whereby a very simple device may be employed for limiting the outward movement of the valve, which device will not be liable to shake loose from the piston and also whereby an even guidance of the valve is obtained in a very simple manner.

A practical embodiment of the invention is represented in the accompanying drawings in which Figure 1 is a longitudinal central section through the piston taken in the plane of the line A—A of Fig. 2 looking in the direction of the arrows. Fig. 2 is a face view of the piston, one-half of the view being taken in section in the plane of the line B—B of Fig. 1 looking in the direction of the arrows, and Fig. 3 is a detail section showing a modified form of ring valve.

1 designates the hollow piston of a double-acting air compressor. The central pipe 2 is connected to the piston and constitutes the inlet for the fluid to be compressed. In the example represented the piston is furnished on the side opposite to the central pipe 2, with a rod 3 for the purpose of making connection between the piston and the motor for driving it.

The piston is provided in one or both of its faces, in the present instance both of its faces, with annular passages 4 located near the periphery of the piston. Ring valves are arranged to open and close the passages 4 as follows. An annular seat 5 is provided exterior to each passage 4 and an annular seat 6 is provided interior to said passage on the face of the piston. The ring valve comprises external and internal flanges 7 and 8 forming the face of the valve and an inwardly extended annular stem 9. In the form shown in Fig. 1, an outwardly extended annular stem 10 is also provided on the valve.

The external and internal flanges 7 and 8 provide valve faces arranged to engage the annular seats 5 and 6 exterior and interior to the annular passage 4 in the piston. The inner circumference of the annular passage 4 in the piston is turned truly to form a cylindrical guide for the inwardly extended annular valve stem 9, the said stem being turned to fit the so formed cylindrical guide with an easy sliding movement. A plate 11 is screwed on to the piston face as shown at 12, which plate is provided with a circumferential flange 13 which is arranged to overlap the internal flange 8 of the ring valve so as to limit the outward movement of the valve. In the form shown in Fig. 1 the periphery of the flange 13 is turned truly to form a cylindrical guide for the outwardly extended annular valve stem 10, the inner wall of which is turned to fit the said cylindrical guide with an easy sliding movement. The valve in this instance is thus guided inside and outside of its external and internal flanges 7 and 8 which form the face of the valve.

In the form shown in Fig. 3, the outwardly extended annular valve stem is eliminated, the valve being guided in this instance by the engagement of its inwardly extended stem with the cylindrical guide formed on the inner circumference of the annular passage in the piston. By providing the guide for the valve inside of its face by screwing the plate which limits the outward movement of the valve, on to the piston, a very simple and strong device is obtained in which the use of all securing bolts is eliminated, the valve at the same time being guided successfully in its movements.

It is evident that various changes might be resorted to in the construction, form and arrangement of the several parts without departing from the spirit and scope of my invention; hence I do not wish to limit myself strictly to the construction herein set forth, but

What I claim is:

1. A hollow piston having an annular passage in its face, a ring valve therefor comprising external and internal flanges and inwardly and outwardly extended annular stems, a guide on the piston for the inwardly extended valve stem and a plate having a guide for the outwardly extended valve stem and serving to limit the outward movement of the valve.

2. A hollow piston having an annular passage in its face, a ring valve therefor comprising external and internal flanges and inwardly and outwardly extended annular stems, a guide on the piston for the inwardly extended valve stem and a plate screwed on to the piston having a guide for the outwardly extended valve stem and serving to limit the outward movement of the valve.

In testimony, that I claim the foregoing as my invention, I have signed my name in presence of two witnesses, this first day of October 1906.

HENRY C. SERGEANT.

Witnesses:
   FREDK. HAYNES.
   HENRY THIEME.